Sept. 11, 1923.
H. F. SMITH ET AL
VALVE
Filed Dec. 16, 1920
1,467,511
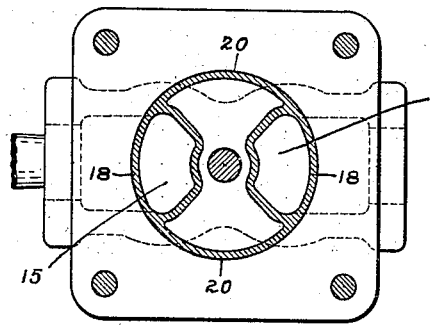
Fig. 3.
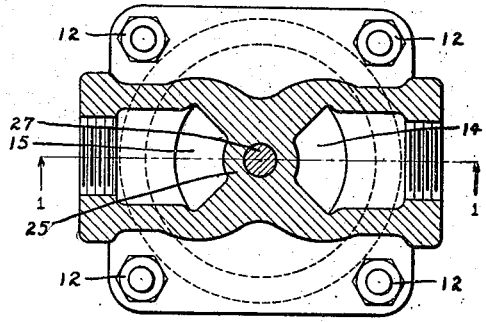
Fig. 2.
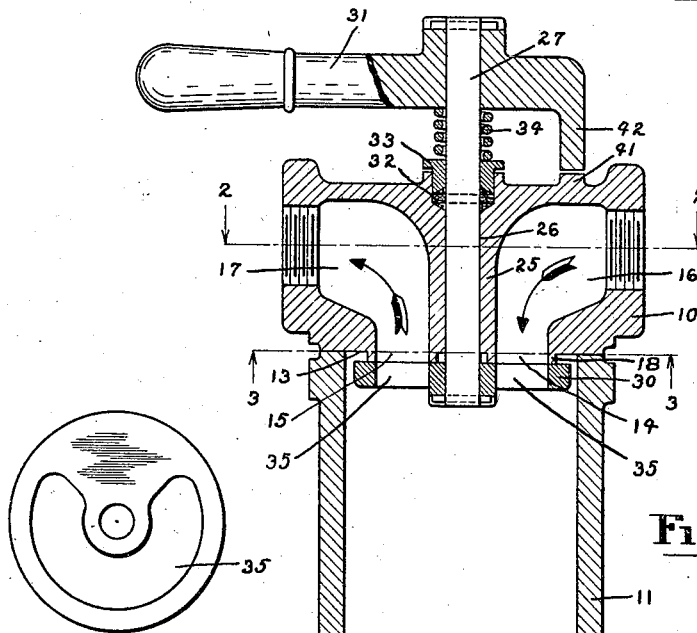
Fig. 1.
Fig. 4.
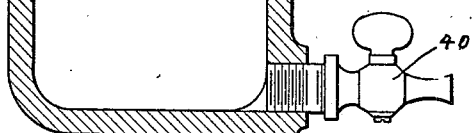
Witnesses
Charles E Greene
Herman F. Lunn
Inventors
Harry F. Smith
Thomas Cureton
By Greer Maréchal
Attorney

Patented Sept. 11, 1923.

1,467,511

UNITED STATES PATENT OFFICE.

HARRY F. SMITH AND THOMAS CURETON, OF DAYTON, OHIO, ASSIGNORS, BY MESNE ASSIGNMENTS, TO THE GAS RESEARCH COMPANY, OF DAYTON, OHIO, A CORPORATION OF OHIO.

VALVE.

Application filed December 16, 1920. Serial No. 431,181.

*To all whom it may concern:*

Be it known that we, HARRY F. SMITH and THOMAS CURETON, citizens of the United States of America, residing at Dayton, county of Montgomery, and State of Ohio, have invented certain new and useful Improvements in Valves of which the following is a full, clear and exact description.

This invention relates to valves and more particularly to a valve especially adapted for the controlling of fluids containing impurities.

One of the principal objects of the invention is to provide a valve of such character that the accumulation of impurities will not cause binding or sticking of the valve parts and will not interfere with the operation thereof.

Another object of the invention is to provide a self-cleaning valve.

Other objects and advantages will be apparent from the description set out below, when taken in connection with the accompanying drawing.

In the drawing, in which like characters of reference designate like parts throughout the several views thereof, Fig. 1 is a sectional view through a valve constructed in accordance with the present invention, the section being along the line 1—1 of Fig. 2;

Fig. 2 is a sectional view along the line 2—2 of Fig. 1;

Fig 3 is a sectional view along the line 3—3 of Fig. 1;

Fig. 4 is a detail view of the valve disc.

In the handling of fluids containing impurities, such a fluid for example as producer gas, the valves heretofore in general use have proved somewhat objectionable. Producer gas generally contains tar and like impurities in varying quantities, and these impurities have a tendency to deposit upon projections within the pipe through which they are being conveyed. As a result substantial quantities of impurity will be deposited in the valves, while the gas is flowing therethrough, and when the valves are closed for any substantial period, as for instance over night, this tar tends to harden and to stick or bind the valve so that frequently it has to be steamed in order to soften the tar sufficiently to permit of its being operated. The valve forming the subject matter of this invention, of which a preferred embodiment is shown in the drawing, is adapted to permit of the handling of producer gas, and other impurity containing fluids, without the encountering of this trouble.

In the drawing the numeral 10 designates the valve casing proper or body member, a trap 11 being rigidly attached to the body member by means of bolts 12, the contacting surfaces of these two members being such as to make a tight, leakproof joint. The face 13, of the body member, within the trap 11, constitutes a valve seat, two ports 14 and 15, which are connected respectively to an inlet passage 16 and an outlet passage 17, opening through this face and connecting the inlet and outlet pipes with the space within the trap. Surrounding each of the ports 14 and 15 are ribs 18 which serve as the valve seat proper. Associated with the ribs 18 and, preferably, forming a continuation thereof are the ribs 20 which also serves as a part of the valve seat proper. If desired these ribs may be located on the valve disc, and when so positioned they will serve the same useful purpose as when located and constructed as shown in the drawing.

Extending through the partition 25 which separates the inlet and outlet passages 16 and 17 from each other is a centrally arranged passage 26 in which is rotatably mounted the valve stem 27. Keyed to the lower end of the valve stem 27, in such wise as to rotate therewith, is a valve member or disc 30 adapted to cooperate with the ribs 18 and 20. Attached to the free outer end of the valve stem is an operating handle 31, by means of which the valve member 30 may be moved into any desired position. Within the outer end of the passage 26 is an enlargement for receiving a packing 32 adapted to prevent leakage through this passage along the valve stem. Located between the operating handle 31 and the gland 33 is a spring 34, which serves the double purpose of holding the valve member snugly against its seat and of forcing the gland 33 against the packing 32 to insure proper compression of the packing material.

Opening from the lower end of the trap 11 is a discharge passage controlled by means of the cock 40. Upon the upper part of the body member 10 are a plurality of indicating lugs of any desired construction. One of these lugs is shown generally as 41, but any desired number and type of lugs may be used. Cooperating with these indicating lugs is an extension 42 carried by the operating handle 31 whereby the position of the valve disc may be accurately determined.

As shown in Fig. 4 the valve disc preferably has therethrough one large port 35, though a plurality of smaller ports may be used if desired. This port is of such size that when the disc is properly positioned it will connect both the inlet and the outlet passages 16 and 17 to the space within the trap, and thus to each other. And the blank space between the ends of this port is of such dimensions that when properly positioned it will close off either the passage 16 or 17, while leaving the other passage connected with the trap 11.

In operation of the device the valve disc is normally so positioned that the port 35 registers with each of the ports 14 and 15. When thus positioned there will be a flow, say of producer gas, through the inlet passage 16 into the trap 11 and thence outwardly through the passage 17. As the gas passes into the trap 11 its velocity of flow will be slowed down and as a result more or less of the impurities within the gas will be separated out under the action of gravity. When it is desired to stop flow of the gas the valve disc may be moved so as to close off either inlet port 14 or the outlet port 15, the closing of either of these ports interrupting the flow through the valve. Ordinarily after any substantial period of operation there will be an accumulation of impurities upon various parts of the valve structure and when the usual type of valve is left in closed position for any length of time these impurities will tend to collect around the valve seat and to harden there, to prevent opening of the valve. In the type of valve construction shown in the drawing, however, any movement of the valve either in opening or closing tends to wipe the face of the valve clean as it moves across the ribs 18 surrounding the inlet and outlet ports. As a consequence when, after a period of operating, the valve is moved into closed position it is wiped clean as it moves into such position and the danger of sticking or binding is thus substantially eliminated.

From time to time it will be desirable to remove from the trap impurities accumulated therein. These impurities are ordinarily of such character that they will not readily drain out. When it is desired to clean out the trap 11 the valve disc is so positioned that the outlet port 15 is closed and the inlet port is in open communication with the trap. The cock 40 is then opened and the pressure of the fluid within the inlet pipe acting upon the impurities within the trap will blow these impurities out.

While this valve is particularly adapted for controlling the flow of producer gas through pipes of comparatively small dimensions, say from one to three inches, it is by no means thus limited in its applicability for it is capable of general use. Therefore, while the mechanism herein shown and described constitutes a preferred form of embodiment of the invention, it is to be understood that other forms might be adopted, all coming within the scope of the claims which follow.

What we claim is:

1. In a valve of the character described, a body member having an inlet passage and an outlet passage therein, a trap attached to said body member, a valve member mounted upon said body member and within said trap, and having a passage therethrough, the construction of the valve being such that it may be positioned to connect both the said inlet and the said outlet passages to the said trap at the same time, or to connect the inlet passage alone thereto.

2. In a valve of the character described, a body member, a depending trap attached thereto; an inlet passage within said body member opening into the trap; an outlet passage within said body member opening into the trap; and a valve member associated with said body member and said trap and adapted to connect either passage separately, or both passages at the same time, to said trap.

3. In a valve of the character described, a body member, a valve seat thereon, a plurality of ports opening through said seats, one constituting an inlet and the other an outlet port; cleaning ribs surrounding said ports; a trap attached to said body member into which both said ports open; and a valve member associated with said valve seat, and so constructed as to connect either or both of said ports to said trap.

4. In a valve of the character described, a body member, a valve seat thereon, ports opening through said seat; cleaning ribs surrounding said ports and serving as a valve seat proper; and a rotary valve member cooperating with said ports and cleaning ribs, the construction being such that upon rotary movement of the valve said ribs wipe the surfaces thereof to remove deposited impurities, and the like, therefrom.

5. In a valve of the character described, a body member, a trap associated therewith; an inlet passage within said body member opening into said trap; an outlet within said body member opening from said trap; a discharge opening in said trap; and a valve member controlling said inlet and outlet passages, the construction being such that both passages may be connected to said trap, or the inlet passage alone connected thereto, whereby the pressure of the fluid within said inlet passage may be utilized to blow out said trap.

In testimony whereof we hereto affix our signatures.

HARRY F. SMITH.
THOMAS CURETON.

Witness:
T. G. PLUMMER.